US005986122A

United States Patent [19]
Lewis et al.

[11] Patent Number: 5,986,122
[45] Date of Patent: Nov. 16, 1999

[54] TREATMENT OF POLYETHERS PRIOR TO HYDROSILYLATION

[75] Inventors: Kenrick M. Lewis, Rego Park, N.Y.; Rudolph A. Cameron, Vienna, W. Va.

[73] Assignee: Witco Corporation, Greenwich, Conn.

[21] Appl. No.: 08/972,084

[22] Filed: Nov. 17, 1997

Related U.S. Application Data

[60] Provisional application No. 60/031,142, Nov. 18, 1996.

[51] Int. Cl.⁶ ........................................................ C07C 7/08
[52] U.S. Cl. ........................ 556/445; 556/437; 556/444; 556/446; 568/675; 568/673; 568/679; 560/263; 560/264
[58] Field of Search ................................. 556/445, 437, 556/444, 446; 568/675, 673, 679; 560/263, 264

[56] References Cited

U.S. PATENT DOCUMENTS

| | | |
|---|---|---|
| 3,280,160 | 10/1966 | Bailey . |
| 3,299,112 | 1/1967 | Bailey . |
| 3,415,891 | 12/1968 | Turumaru et al. . |
| 3,505,377 | 4/1970 | Morehouse . |
| 3,507,815 | 4/1970 | Bailey et al. . |
| 3,980,688 | 9/1976 | Litteral . |
| 4,025,456 | 5/1977 | Litteral et al. . |
| 4,061,609 | 12/1977 | Bobear . |
| 4,847,398 | 7/1989 | Mehta et al. . |
| 5,118,764 | 6/1992 | Ichinohe et al. . |
| 5,159,096 | 10/1992 | Austin et al. . |
| 5,191,103 | 3/1993 | Mehta et al. . |

OTHER PUBLICATIONS

J. B. Plumb, Copolymers Containing Polysiloxane Blocks, Halsted Press, pp. 305–353 (1968).
R. J. Boudreau, How Silicone Surfactants affect Polyurethane Foams, Modern Plastics vol. 44. (1984).
L. J. Berliner, Spin Labeling—Theory and Applications, Academic Press, p. 425, (1976).
A. Lee Smith, Analysis of Silicones, Wiley–Interscience Publication, pp. 145–149 (1974).
Dr. Günther Oertel, Polyurethane Handbook, Hanser Publications (1985).
S. Ichinohe, Non–Odor Type of Polyether Modified Silicones for Cosmetics, J. Soc. Cosmet Chemical, vol. 27 No. 3 (1993).
C. Anderson Evans, Spin Trapping Aldrucgunuca Acta, vol. 12, No. 2 (1979).
A. T. Diplock 'Measurement of Antioxidants and Degradation Products of Peroxides' Analytical Proceedings, Aug. 1990, vol. 27.
R. M. Johnson and I. W. Siddiqi, The Determination of Organic Peroxides Pergamon Press, London (1970).
W. M. Cort, Advances in Chemistry Series, vol. 200 (1982) 533–550.
R. Thompson, Specialty Inorganic Chemicals, The Royal Society of Chemistry, special publication 40 (1984).
G. Blair and P Staal, Kirk–Othmer Encyclopedia of Chemical Technology, vol. 6, pp. 354–380 (1973).
I. N. Topchiyeva, et al., Polymer Science, USSR, 31 (1989) 798–803.
W. Gerhardt and C. Martens, Zeitschrift fur Chemie, 25 (1985) 143.
R. N. Mokeyeva, Y. A. Tsfarin and W. Ernst, Journal of Chromatography, 264 (1983) 272–278.
W. F. Brill, Journal Chemical Society, Perkin Transactions, II (1984) 621–627.
B. Kanner et al., Synthesis and Properties of Siloxane–Polyether Copolymer Surfactants, I & EC Product Research and Development vol. 6 No. 2 pp. 88–92 (1967).
B. Grüning, Silicone Surfactants,' Tenside Surfactant Det. (1989) pp.312–317.
Y. Kamiya and E. Niki, Degradation and Stabilization of Polymers, 1 (1983) 337–357. (Edited by H. H. G. Jellinek, Elsevier, Amsterdam).
E. Basceta and F. D. Gunstone, Chemistry and Physics of Lipids, 36 (1985) 253–261.
J. C. Bauernfeind, Inter. Journal Vitamin Nutrition Res. Suppl., 27 (1985) 307–333.
J. N. Counsell and D. H. Horning (Editors), Vitamin C, Applied Science, London, U.K. (1981); H. Klaeui and G. Pongracz, pp. 139–166.
Chemical Economics Handbook, Citric Acid, Stanford Research Institute, Menlo Park, CA, 1990.
Derwent Publication Ltd., London, GB; AN 68–04171Q, XP002054875 & JP 43008830—Abstract (1991).
Derwent Publication Ltd., London, GB, AN 78–224033A, XP002054876 & JP 50156599A (Kanegafuchi Chem. KK)—Abstract (1993).
Derwent Publication Ltd., London, GB, AN 77–62081Y, XP002054877 & JP 52086499A (Nippon Oils & Fats Co. Ltd.)—Abstract (1994).
WO 92 12950 (Henkel KGAA) (1992).

*Primary Examiner*—James H. Reamer
*Attorney, Agent, or Firm*—Edward K. Welch, II; Andrew S. Reiskind; Timothy X. Witkowski

[57] ABSTRACT

This Invention discloses the use of ascorbic and citric acid, their salts, ethers, acid esters and mixtures thereof in a method for the prevention of peroxide formation, and/or for decomposing peroxides already formed in polyethers. Hereby, the polyethers are made reactive to hydrosilylation by silanes and hydrosiloxanes. When the polyether treatment is done with mixtures of ascorbic acid and sodium ascorbate and allyl polyethers, the hydrosilylation product contains reduced levels of propanal. The copolymers prepared using the treated polyethers are efficient stabilizers of flexible polyurethane foams and rigid polyurethane and polyisocyanurate foams.

19 Claims, No Drawings

TREATMENT OF POLYETHERS PRIOR TO HYDROSILYLATION

This application claims priority from U.S. provisional application Ser. No. 60/031,142, filed Nov. 18, 1996.

BACKGROUND OF THE INVENTION

The preparation of siloxane-oxyalkylene polyether copolymers ("Copolymers") by the hydrosilylation reaction of an organohydridosiloxane and an unsaturated polyoxyalkylene (polyether) is well known in the art. The Copolymers may be prepared from allyl, methallyl or propargyl started polyethers and polydimethylhydridosiloxanes in the presence of solvents as described in U.S. Pat. Nos. 3,980,688 and 4,025,456, or under solventless conditions with specific additives as disclosed in U.S. Pat. Nos. 4,847,398, 5,191,103 and 5,159,096. Whatever the method or process, it is essential that the polyethers be free of contaminants which can inhibit the rate, selectivity and completeness of the catalytic hydrosilylation.

Although it is known that oxidation impurities in the polyethers inhibit the hydrosilylation of the polyethers, the exact identities of these inhibitors are unknown. They are believed to include acetal hydroperoxides, allyl hydroperoxides and free radicals localized at the tertiary carbon atoms in the hydrophobic segments (e.g., propylene oxide) of unsaturated polyethers. Oxidation impurities are most likely to occur in polyethers which have been stored for a long period with no or insufficient quantities of antioxidant. However, they may also be present in freshly prepared polyethers which may have gotten too hot in the presence of air or oxygen.

The hydrosilylation activity of polyethers containing oxidation impurities appears to depend on the specific hydroperoxides present in the polyether. In some cases, less than 100 parts per million (ppm) hydroperoxides will inhibit hydrosilylation, while in others as much as 2500 parts per million (ppm) hydroperoxides is tolerable. Indeed, the use of organic hydroperoxides as temporary catalyst inhibitors in the addition-cure synthesis of silicone gels and elastomers is disclosed in U.S. Pat. No. 4,061,609.

For example, propanal, even at low (ppm) levels is a source of unacceptable quality in the copolymer product. When the polyethers are uncapped, the Copolymer can have a higher than expected viscosity, or may even gel, on account of crosslinking (acetal formation) between the hydroxyl groups and the propanal. As disclosed in U.S. Pat. No. 4,847,398, sodium carboxylates can control allylpropenyl isomerization and act to prevent the propenyl ether cleavage resulting in propanal formation.

Sodium borohydride, $NaBH_4$, is known to be effective for the decomposition of peroxides in polyethers. The polyethers are made suitable for hydrosilylation by this treatment, but experiments have shown that the resulting Copolymers are not necessarily acceptable.

Unrelatedly, an extensive prior art already exists on the use of ascorbic acid, its alkali metal salts and ascorbic acid esters as antioxidants in foods and medicines. Citric acid, its salts and esters have also been used as food additives, primarily for pH and flavor control. However, there appears to be no teachings regarding the use of these acids or their derivatives with industrial chemicals.

SUMMARY OF THE INVENTION

Disclosed herein is the use of ascorbic acid and/or citric acid and their derivatives, as antioxidants and decomposition agents for oxidation impurities in polyethers, especially unsaturated polyethers intended for use in hydrosilylation reactions. The treated polyethers undergo smooth and complete hydrosilylation and the resulting Copolymers are effective surfactants for polyurethane and polyisocyanurate foams. Mixtures of the ascorbate salts and ascorbic acid or other ascorbate derivatives are particularly preferred because they obviate the need for sodium carboxylates and other additives which limit propanal and acetal formation during hydrosilylation.

DETAILED DESCRIPTION OF THE INVENTION

Accordingly, it is an object of this invention to provide an improved method and process for the decomposition of oxidation impurities in polyethers, particularly unsaturated polyethers to be hydrosilylated for the preparation of Copolymers. With the present invention, one may achieve at least a fifty percent, and preferably seventy-five percent and most-preferably one hundred percent, reduction of peroxides in the polyethers. An additional object is to provide an improved process for hydrosilylation wherein ascorbate and/or citrate derivatives, and their reaction products arising from thermal decomposition and/or from the reduction of oxidation impurities in unsaturated polyethers are employed as catalyst modifiers to minimize or prevent propanal and acetal formation. With the present invention one can achieve at least a 90% conversion, preferably $\geq 95\%$ conversion, and most preferably a $\geq 99.5\%$ conversion of hydrosilyl fluid to a polyether modified silicone. A still further object is to provide an improved method for making unsaturated polyethers storage-stable and resistant to the formation of oxidation impurities. With the present invention one can achieve impurities of less than 500 ppm, preferably less than 200 ppm and most preferably less than 100 ppm.

Ascorbate and citrate treatment of allyl started polyethers facilitates complete, efficient and more uniform hydrosilylation in the manufacture of Copolymers. Process control is improved, reaction times are shortened and the quality of the Copolymers is consistently acceptable. The improved reactivity of the ascorbate and citrate treated polyethers permits the use of lower reaction temperatures and lower platinum catalyst concentrations, both of which conditions afford reaction products with desirable odor, clarity and pourability. In fact, with the present invention platinum levels as low as 10 ppm may be used on a regular basis. Recatalysis of incompletely hydrosilylated reaction mixtures is avoided and batch times are reduced. Production capacity increases and cost savings accrue.

Polyethers

The polyethers of this invention are blocked or random polyoxyalkylenes having the general formula:

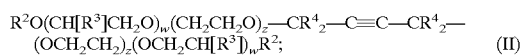

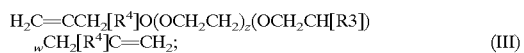

wherein $R^1$ denotes an unsaturated organic group containing from 3 to 10 carbon atoms such as allyl, methlallyl, propargyl or 3-pentynyl. When the unsaturation is olefinic, it is desirably terminal to facilitate smooth hydrosilylation. However, when the unsaturation is a triple bond it may be internal. $R^2$ is hydrogen, or a polyether capping group of from 1 to 8 carbon atoms such as alkyl groups (e.g., $CH_3$, $n$-$C_4H_9$, $t$-$C_4H_9$ or $i$-$C_8H_{17}$), acyl groups (e.g., $CH_3COO$—, t-$C_4H_9COO$), beta-ketoester group (e.g., $CH_3C(O)CH_2C(O)$O—), or a trialkylsilyl group. $R^3$ and $R^4$ are monovalent hydrocarbon groups such as $C_1$–$C_{20}$alkyl group (e.g., methyl, ethyl, isopropyl, 2-ethylhexyl, dodecyl and stearyl), or aryl groups (e.g., phenyl and naphthyl), or alkaryl groups (e.g., benzyl, phenylethyl and nonylphenyl), or cycloalkyl groups (e.g., cyclohexyl and cyclooctyl). $R^4$ may also be hydrogen. Methyl is the most preferred $R^3$ and $R^4$ groups. Z is 0 to 100 inclusive and W is 0 to 100 inclusive, but z+w>0. Preferred values of z and w are 1 to 50 inclusive.

Ascorbic Acid

Ascorbic acid is a dibasic acid with strong reducing potential. It and its derivatives, such as the ascorbyl esters, ascorbate ethers and ascorbate salts, are suitable reductants for peroxides and hydroperoxides in polyethers. The general structure of ascorbic acid and ascorbate materials is:

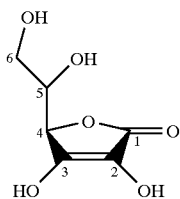

In the ascorbate structure, salts are formed by the neutralization of the acidic hydrogens in the OH groups at the 2 and 3 positions. The salts of the alkali metals (e.g., Na, K), alkaline earth metals (e.g., Mg, Ca) and organic cations (e.g., tetraalkyl ammonium wherein the alkyl groups contain $C_1$–$C_{20}$ carbon chains) are useful antioxidants in this invention. Sodium ascorbate is a preferred antioxidant.

Ascorbyl esters result from the reaction of ascorbic acid with acids, acid chlorides and acid anhydrides. All four OH groups may be esterified. However, C-2 and C-6 substituted esters have the highest antioxidant effect. Suitable esters are ascorbyl propionate, ascorbyl octoate, ascorbyl laurate, ascorbyl palmitate, ascorbyl dipalmitate, ascorbyl stearate and the $C_2$–$C_{20}$ polyfluoroalkyl esters of ascorbic acid. Ascorbyl palmitate is a preferred antioxidant. Alkali and alkaline earth metal salts of the C-2 and/or C-6 substituted ascorbate esters are also suitable agents.

Ethers may also be formed at all four hydroxyl positions in ascorbic acid as follows:

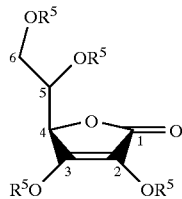

Those with the most potent antioxidant activity are substituted at C-2 and C-6 with hydrocarbon and polyethers, shown as $R^5$. Suitable examples of $R^5$ are the monovalent hydrocarbon alkyl, aryl, alkaryl and cycloalkyl groups, as defined herein above for $R^3$, and polyoxyalkylene moieties formed by the addition of oxyalkylenes (e.g., ethylene oxide, propylene oxide and isobutylene oxide), to ascorbic acid. Suitable ascorbate ethers are 2,6-di-O-methylascorbic acid, 2-O-octadecylascorbic acid, 3-O-pentadecylascorbic acid and 2-O-dodecyl-6-O-acetylascorbic acid.

Ketals and acetals of ascorbic acid are also suitable antioxidants for the instant invention. The ketals are formed by condensing ascorbic acid with ketones such as acetone, cyclohexanone, methyl dodecyl ketone and hexafluoroacetone. The ketals may be represented by:

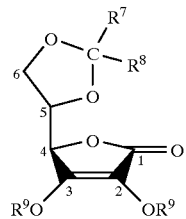

where $R^7$ and $R^8$ are $C_1$–$C_{20}$ monovalent hydrocarbon groups such as alkyl aryl alkaryl and cycloalkyl. $R^7$ and $R^8$ may also be $C_1$–$C_{20}$ polyfluorohydrocarbon groups such as hexafluoropropyl. $R^9$ may be hydrogen, an ester group as defined above or a monovalent hydrocarbon group as defined for $R^5$. If either $R^7$ or $R^8$ is hydrogen, the structure is an acetal of ascorbic acid. Among the acetals and ketals, 5,6-isopropylideneascorbic ($R^7$, $R^8$=$CH_3$, $R^9$=H) is a preferred antioxidant While in most cases, L-ascorbic acid and the L-ascorbate derivatives will be more readily available and most effective as antioxidants, D-ascorbic and its derivatives, and D- and L-isoascorbic acid and their derivatives are also effective in decomposing oxidation impurities in polyethers and other substrates to be hydrosilylated.

Citric Acid

Citric acid, its metal salts and its esters are also effective at decomposing peroxides and other oxidation impurities in polyethers. Citric acid is 2-hydroxy-1,2,3-propanetricarboxylic acid, $HOC(COOH)(CH_2COOH)_2$. It forms monobasic, dibasic and tribasic metal salts. Similarly, its esters can have complete or partial derivatization of the carboxylic acid groups. The tricitrates, dicitrates and monocitrates are all suitable individually, as mixtures of esters or as components in mixtures with citric acid and citrate salts, to improve the hydrosilylation reactivity of polyethers. Metal salts of the monocitrate and dicitrate esters are also included herein.

Suitable citrate salts are the anhydrous and hydrated alkali metal salts, e.g., trisodium citrate dihydrate, potassium dihydrogen citrate and tripotassium citrate monohydrate, the alkaline earth metal citrates such as tricalcium citrate tetrahydrate and magnesium citrate and mixed metal citrates such as sodium zinc citrates. The citrates of sodium and potassium are preferred; tripotassium citrate, trisodium citrate and trilithium citrates are especially preferred.

Triesters of citric acid have the general formula, $HOC(COOR^6)(CH_2COOR^6)_2$, in which $R^6$ is an alkyl cycloalkyl, aryl alkaryl, or polyfluorohydrocarbyl group. Methyl ethyl, isopropyl butyl, cyclohexyl 2-ethylhexyl dodecyl stearyl benzyl nonylphenyl and heptafluoropropyl are examples of these $R^6$ groups. Triethyl citrate, tricyclohexyl citrate, trioctyl citrate and tristearyl citrate are preferred.

Citric diesters have the general formula, $HOC(COOH)(CH_2COOR^6)_2$ for the symmetrical isomers and $HO(COOR^6)(CH_2COOR^6)CH_2COOH$ for the unsymmetrical isomers. Citric monoesters, respectively $HOC(COOR^6)(CH_2COOH)_2$ and $HOC(COOH)(CH_2COOH)(CH_2COOR^6)$, may also be symmetric and unsymmetric. $R^6$ has the same meaning in the monoester and diester formulae as defined above for the citric triesters.

Use of Antioxidants

The ascorbate and citrate acids and their derivatives discussed above, i.e., salts, esters, ketals, acetals and ethers (collectively "Antioxidants") may be employed as solids, as liquids, as aqueous or alcoholic solutions, or as suspensions and solutions in solvents which do not otherwise impede the hydrosilylation or undesirably affect the yield and quality of the reaction product. Use levels depend on the concentration of oxidation impurities in the unreactive polyethers and the molecular weight of the Antioxidant. Amounts from about 0.01 to about 20 weight percent (based on the weight of polyether to be treated) are effective, with 0.1 to 10 weight percent being preferred. However, it is concievable that some other polyethers will require less or substantially more Antioxidant to become hydrosilylation reactive.

For the present process, the polyether and Antioxidants are mixed together and heated to 50–100° C. for 30 minutes to 6 hours, preferably 1–4 hours, in an inert atmosphere. Intense yellow to orange coloration may be observed in the reaction mixture depending on the type and concentration of oxidation impurities. Water, ethanol, or another solvent that may have been used to introduce the Acid is distilled away during this time. Filtration and decolorization aids such as CELITE®, HIFLO®, silica or activated carbon optionally are included during the destruction of the oxidation impurities. However, since these aids they do not contribute to the peroxide, hydroperoxide and free radical destruction, they are usually added after the heat treatment and prior to a filtration step to remove any reaction products. The filtered polyether may be stored over 4A molecular sieve, or another suitable dessicant, to remove residual water.

Iodometric and colorimetric analyses of the filtered, dried polyethers have shown that Antioxidants reduce peroxide and hydroperoxide levels in polyethers from >2000 ppm down to <100 ppm, even <50 ppm, after a single treatment. Nonetheless, it is concievable that multiple treatments may be required in some cases to reduce the peroxide and hydroperoxide concentrations from initially higher concentrations down to these low levels.

Many ascorbate esters and ethers and citrate esters are soluble in the polyethers to be treated. Thus, when these esters and/or ethers are used alone or in combination with each other, filtration may not be necessary. The Copolymers containing Antioxidant oxidation products exhibit desirable foam processing and properties and thus these Antioxidants and reaction products do not need to be filtered out.

Antioxidants can also be added during the actual hydrosilylation of the untreated, partially oxidized polyether. However, poor reactivity and incomplete reaction of all SiH bonds can sometimes attend this method. Accordingly, it is preferable to purify the polyether, or forestall peroxide generation, in a separate step prior to the hydrosilylation reaction.

Addition of Antioxidants to already made polyether prevents peroxide formation and improve storage stability of polyethers. This method also permits the recovery and use of poorly reacting polyethers. The method arrests the formation of propanal as a by-product in copolymers made with allyl polyethers, thereby contributing to low odor and low viscosity in the resulting products.

When ascorbate or citrate salts are used alone, or in combination with other Antioxidants, to destroy oxidation impurities in polyethers it is unnecessary to make a separate addition of carboxylate salts to minimize or prevent propanal and acetal formation during the subsequent hydrosilylation of the filtered, dried polyether. For example, when initially unreactive uncapped allyl polyethers were treated with sodium ascorbate—ascorbic acid mixtures, wherein the salt to acid molar ratio spanned 1–100, in the method described above for the decomposition of oxidation impurities, the Copolymer made via the hydrosilylation of these treated polyethers had no discernible odor of propanal and did not gel The same polyether treated with ascorbic acid alone was reactive to hydrosilylation, but the copolymer product had a distinct propanal odor. Additionally, $^{13}C$ nuclear magnetic resonance spectroscopy (NMR) confirmed the presence of acetal in the Copolymer made without ascorbate additives, and the absence of acetal from the copolymer product made with sodium ascorbate—ascorbic acid mixtures. $^{13}C$ NMR analysis and gas chromatography head-space analysis also confirmed the presence of propanal in copolymer products made without ascorbate additives and its absence from products made with ascorbate—ascorbic acid mixtures.

Use of Polyethers

The polyethers produced above are intended to be hydrosilated with organohydridosiloxanes (organo-substituted, e.g. $C_1$–$C_4$-substituted) polysiloxanes a portion of whose silicon atoms are substituted with hydrogen) which may be prepared by equilibration using methods and materials well known in the art as disclosed in U.S. Pat. No. 5,145,879, which is incorporated herein by reference. The Copolymers prepared with the purified polyethers are effective stabilizers of flexible and rigid polyurethane and polyisocyanurate foams. The copolymers afforded excellent dimensional stability and low initial and aged k-factors in a number of rigid foam formulations, for example those illustrated in U.S. Pat. No. 4,795,763.

The experiments disclosed below are intended to illustrate the method of the present invention.

EXAMPLE 1

This example illustrates the poor hydrosilylation reactivity of polyethers containing peroxides and other oxidation impurities. The allylpolyether samples were selected from various lots of commercial products which had been in storage for at least two years. As shown in Table 1 below and in Tables 2 and 5 of U.S. Pat. No. 5,145,879, which are incorporated herein by reference, blends of two polyethers were used in the preparation of Copolymers suitable as stabilizers for flexible polyurethane foam. PE550-OAc was a 550 molecular weight, all ethylene oxide (EO), acetoxy-capped polyether. PE4000-OAc was a 4000 molecular weight, 40 weight percent EO—60 weight percent propylene oxide (PO), acetoxy capped polyether. Peroxide analysis of the polyether blends was performed with the CHEMetrics, Inc. Model HP-10B kit and with the iodine—thiosulfate titration described in R. M. Johnson and I. W. Siddiqi, *The Determination Of Organic Peroxides*, Pergamon Press, London, 1970, chp.3. The peroxide content and reactivity of a polyether blend made from three month old samples are shown for comparison in Example 1D. Hydrogen peroxide (2300 parts per million, ppm) was intentionally added to this blend for the experiment illustrated in Example 1E. All of the polyether blends used contained a stoichiometric excess of allyl functional groups relative to the SiH functional groups of the hydridosiloxane fluid.

Reactivity was measured by the time and magnitude of the temperature increase, by completeness of the utilization of the hydridosiloxane reagent and by the platinum concentration required for complete hydridosiloxane utilization. Completeness of utilization of the hydridosiloxane was determined by measuring the volume of $H_2$ produced when the reaction mixture was treated with alcoholic KOH as described by A. L. Smith, Analysis Of Silicones, John Wiley and Sons, NY 1974, pp 145–149.

The hydridosiloxane, $MD_{65}D'_8M$, in which $M=(CH_3)_3iO_{1/2}$, $D=(CH_3)_2SiO$ and $D'=CH_3SiHO$, was prepared as described in U.S. Pat. No. 5,145,879, which is incorporated herein by reference. Quantities of raw materials used in the hydrosilylation experiments are reported in Table 1. The hydrosilylation was performed in a 4-necked round bottom flask fitted with a mechanical stirrer, Friedrich condenser, heating mantle and temperature controller, and a sparge tube connected to a nitrogen cylinder. The controller had a digital display of the temperature and was also connected to a recorder to provide a continuous temperature readout of the course of the hydrosilylation reactions. A gentle flow of nitrogen was introduced following the addition of the blend of allylpolyethers (65.6–65.8 gm), the hydridosiloxane (29.6–29.7 gm) and 0.1 gm butylated hydroxytoluene to the flask. The reaction mixture was stirred and heated to 80° C., at which point the nitrogen sparge was discontinued and the reaction was catalyzed with 0.4 cc of a 10 mg Pt/ml solution of chloroplatinic acid in ethanol. A temperature increase, characteristic of exothermicity of hydrosilylations, was observed after some minutes and the reaction mixture was either hazy (Examples 1A, 1B, 1C, 1E) or clear (Example 1D) depending on the completeness of the reaction. Peak exotherms and the times of their observation following the addition of Pt catalyst are summarized in Table 2 for the polyether blends shown in Table

TABLE 1

PEROXIDE CONTENT OF POLYETHER BLENDS USED IN HYDROSILYLATION REACTIONS WITH $MD_{65}D'_8M$ IN EXAMPLE 1

| EXAMPLE | PE550-OAc, gm | PE4000-OAc, gm | PEROXIDE, ppm |
|---|---|---|---|
| 1A | 26.6 | 39.0 | 1000 |
| 1B | 26.6 | 39.0 | 1500 |
| 1C | 26.7 | 39.1 | 2300 |
| 1D | 26.7 | 39.1 | 64 |
| 1E | 26.6 | 39.1 | 2300 |

TABLE 2

EFFECT OF PEROXIDE CONTENT OF POLYETHER ON ITS HYDROSILYLATION REACTIVITY

| EXAMPLE | PEROXIDE, ppm | EXOTHERM | SiH CONV, % |
|---|---|---|---|
| 1A | 1000 | 10° C. in 4.3 min | 95 |
| 1B | 1500 | 5° C. in 5 min | 90 |
| 1C | 2300 | 4° C. in 5.5 min | 83 |
| 1D | 64 | 20° C. in 3.2 min | 100 |
| 1E | 2300 | 4° C. in 5.3 min | 85 |

These results show that a higher exotherm was observed in a shorter time in the reaction of Example 1D than in the other experiments. This means that the polyether blend used in the experiment of Example 1D was more reactive and was completely reacted compared to those in Examples 1A, 1B, 1C and 1E. These results also show that the presence of peroxide in the polyethers above some threshold value effectively inhibits the rate and completeness of the hydrosilylation reaction. Sluggish reactivity such as was exhibited by Examples 1A, 1B, 1C, and 1E is usually overcome by increasing reaction temperature or increasing catalyst usage, either by recatalyzing the incomplete reaction or adding a higher initial concentration. Note that the antioxidant, butylated hydroxytoluene, was ineffective in counteracting the inhibitive catalytic effects of the peroxides and other oxidation impurities in the polyether.

Likewise, completeness of the hydrosilylation, as measured by the conversion of SiH functional groups, was affected by the peroxide content of the polyethers. The higher the peroxide content of the polyethers the lower was the SiH conversion. It is essential that siloxane-polyether copolymers intended for use as stabilizers for polyurethane foams be substantially free of unreacted SiH groups. Otherwise, foam collapse or undesirable cell size and cell size distribution may result.

EXAMPLE 2

This example illustrates the use of ascorbic acid, sodium ascorbate and their mixtures to destroy peroxides in polyethers of low or no hydrosilylation reactivity. L-Ascorbic acid and sodium L-ascorbate were employed as 40 wt % aqueous solutions. The polyethers treated are described in Table 3. Table 4 records the weights of polyethers treated and the weights of the ascorbate solutions used for peroxide destruction. Treatment was performed in a 4 neck round bottom flask of volume appropriate for the the quantity of polyether to be treated. The flask was equipped with a temperature-controlled heating mantle, thermometer, mechanical stirrer, nitrogen sparge tube, Claisen connection, Friedrich condenser and trap. In all experiments, the polyether, ascorbic acid and/or sodium ascorbate were charged to the flask and the contents stirred, sparged and heated to 80° C. (except 2M and 2P) for the times indicated in Table 4. The bright yellow liquid was then cooled and pressure filtered through a coarse pad to produce a colorless to faintly straw colored product, which was optionally stored over 4A molecular sieve overnight to remove the water not lost by evaporation during the peroxide destruction. Temperatures used in Examples 2M and 2P are set forth in Table 4.

TABLE 3

DESCRIPTION OF POLYETHERS TREATED WITH ASCORBIC ACID AND SODIUM ASCORBATE

| POLYETHER | MOL. WT. | WT. % EO | CAPPING GROUP |
|---|---|---|---|
| PE550-OAc | 592 | 100 | Acetoxy |
| PE550-OMe | 564 | 100 | Methyl |
| PE750-OH | 750 | 75 | None |
| PE750-OMe | 764 | 75 | Methyl |
| PE1400-OAc | 1442 | 75 | Acetoxy |
| PE1500-OAc | 1542 | 40 | Acetoxy |
| PE4000-OAc | 4042 | 40 | Acetoxy |

The data of Table 4 show that ascorbic acid, sodium ascorbate and their mixtures are effective at peroxide decomposition in polyethers. This decomposition was accomplished in polyethers spanning a wide range of molecular weights, EO content and capping groups.

As shown by the peroxide data for Examples 2A–2T, both ascorbic acid and sodium ascorbate individually, or as mixtures, will decompose peroxides in polyethers. The extent of the destruction depends on the quantity of ascorbic acid and/or sodium ascorbate used, on the temperature and on the initial concentration of peroxide in the polyether. For example, the use of 0.79 wt % ascorbic acid in Example 2D was more effective than the use of 0.28 wt % in Example 2C. Likewise, with the ascorbate mixtures used in Examples 2E–2H, there was more peroxide decomposition in 2G and 2H than in 2E and 2F. Examples 2M–2P illustrate the role of temperature. Even after 16 hours ascorbate treatment at room temperature, the polyether sample of Example 2P still retained 83% of its original peroxide. The same level of ascorbate was effective at 50° C. (Example 2M) and more effective at 80° C. (Example 2N).

TABLE 4

SUMMARY OF POLYETHER TREATMENT EXPERIMENTS WITH ASCORBIC ACID AND SODIUM ASCORBATE

| EXAMPLE | POLYETHER | WEIGHT USED, gm | ASCORBIC ACID, gm | SODIUM ASCORBATE, gm | REACTION TIME, min | PEROXIDE (ppm) INITIAL | PEROXIDE (ppm) FINAL |
|---|---|---|---|---|---|---|---|
| 2A | PE550-OAc | 1000 | — | 23.5 | 120 | 1080 | 10 |
| 2B | PE550-OAc | 1000 | 20.5 | — | 120 | 1080 | 10 |
| 2C | 40.5 wt % PE550-OAc + 59.5 wt % PE4000-OAc | 2000 | 13.87 | — | 120 | 1680 | 470 |
| 2D | 40.5 wt % PE550-OAc + 59.5 wt % PE4000-OAc | 2000 | 39.44 | — | 120 | 1680 | 70 |
| 2E | 40.5 wt % PE550-OAc + 59.5 wt % PE4000-OAc | 2000 | 1.3 | 14.8 | 120 | 1680 | 276 |
| 2F | 40.5 wt % PE550-OAc + 59.5 wt % PE4000-OAc | 2000 | 1.2 | 6.99 | 120 | 1680 | 420 |
| 2G | 40.5 wt % PE550-OAc + 59.5 wt % PE4000-OAc | 2000 | 0.53 | 29.73 | 120 | 1680 | 0 |
| 2H | 40.5 wt % PE550-OAc + 59.5 wt % PE4000-OAc | 2000 | 0.4 | 48.4 | 120 | 1680 | 0 |
| 2I | 40.5 wt % PE550-OAc + 59.5 wt % PE4000-OAc | 2000 | — | 49.1 | 120 | 1680 | 28 |
| 2J | 40.5 wt % PE550-OAc + 59.5 wt % PE4000-OAc | 2000 | — | 46.4 | 120 | 1150 | 12 |
| 2K | PE750-OMe | 3500 | 9.4 | 1.0 | 120 | 1300 | 44 |
| 2L | PE1500-OAc | 300 | 0.08 | 4.32 | 120 | 1780 | 270 |
| 2M | PE1500-OAc | 300 | 0.16 | 2.66 | 60 at 50° C. | 1780 | 380 |
| 2N | PE1500-OAc | 300 | 0.16 | 2.66 | 60 at 80° C. | 1780 | 108 |
| 2P | PE1500-OAc | 300 | 0.16 | 2.66 | 16 hr at 23° C. | 1780 | 1480 |
| 2Q | PE1500-OAc | 300 | 0.2 | 4.64 | 60 | 168 | 0 |
| 2R | PE550-OMe | 300 | 0.30 | 3.08 | 60 | 1000 | 20 |
| 2S | PE1400-OAc | 300 | 1.6 | 5.1 | 120 | 1500 | 0 |
| 2T | PE750-OH | 300 | 0.44 | 4.44 | 120 | 1100 | 0 |

EXAMPLE 3

This example illustrates the improved hydrosilylation reactivity of the polyethers treated with ascorbic acid, sodium ascorbate and their mixtures in Example 2. Hydrosilylation was performed as described in Example 1. The reagents, observations and completeness of the reactions are recorded in Table 5.

TABLE 5

IMPROVED HYDROSILYLATION ACTIVITY AND STABILITY OF THE ASCORBATE TREATED POLYETHERS OF EXAMPLE 2.

| EXAMPLE | POLYETHER | METHOD | SiH FLUID | NOTES | SiH CONV. |
|---|---|---|---|---|---|
| | PE550-OAc | | $MD_{40}D'_{11.5}M$ | | |
| 3A | 74.9 g | none | 32.4 g | 23° C. in 1.5 min | 87% |
| 3B | 74.9 | Ex. 2A | 32.4 | 50° C. in 30 sec | 100 |
| | PE550-OAc | | $MD_{42.7}D'_{6.2}M$ | | |
| 3C | 51.8 g | none | 40.2 g | 35° C. in 1.2 min | 76% |
| 3D | 53.7 | Ex. 2B | 38.7 | 38° C. in 40 sec | 100 |
| | PE BLEND | | $MD_{65}D'_8M$ | | |
| 3E | 65.6 g | none | 26.7 g | 11° C. in 4 min | 89% |
| 3F | 65.6 | Ex. 2C | 26.7 | 13° C. in 2.2 min | 100 |
| 3G | 65.6 | Ex. 2D | 26.7 | 15° C. in 2.4 min | 100 |
| 3H | 65.6 | Ex. 2E | 26.7 | 15° C. in 2.6 min | 100 |
| 3I | 65.6 | Ex. 2F | 26.7 | 17° C. in 4.2 min | 100 |
| 3J | 65.6 | Ex. 2G | 26.7 | 19° C. in 2.6 min | 100 |
| 3K | 65.6 | Ex. 2H | 26.7 | 18° C. in 3.2 min | 100 |
| 3L | 65.6 | Ex. 2I | 26.7 | 16° C. in 2.2 min | 100 |
| 3M | 65.6 | Ex. 2J | 26.7 | 16° C. in 3.7 min | 100 |
| | PE750-OMe | | $MD_{13}D'_{5.5}M$ | | |
| 3N | 144.6 g | none | 38.6 g | 17° C. in 3.5 min | 87% |
| 3P | 144.6 | Ex. 2K | 38.6 | 33° C. in 3.5 min | 100 |
| | PE1500-OAc | | $MD_{45}D'_{5.1}M$ | | |
| 3Q | 70.7 g | none | 26.7 g | 4° C. in 7 min | 50% |
| 3R | 69.4 | Ex. 2L | 26.6 | 17° C. in 3.5 min | 100 |

TABLE 5-continued

IMPROVED HYDROSILYLATION ACTIVITY AND STABILITY OF THE ASCORBATE TREATED POLYETHERS OF EXAMPLE 2.

| EXAMPLE | POLYETHER | METHOD | SiH FLUID | NOTES | SiH CONV. |
|---------|-----------|--------|-----------|-------|-----------|
| 3S | 69.4 | Ex. 2M | 26.6 | 12° C. in 4.1 min | 99 |
| 3T | 69.4 | Ex. 2N | 26.6 | 17° C. in 1.5 min | 100 |
| 3U | 69.4 PE1500-OAc | Ex. 2P | 26.6 $MD_{45}D'_{5.1}M$ | 6° C. in 8.6 min | 66 |
| 3V | 69.4 g | none | 26.6 g | 17° C. in 2.8 min | 100% |
| 3W | 69.4 | Ex. 2Q | 26.6 | 17° C. in 1.4 min | 100% |

In this table, METHOD refers to the peroxide decomposition conditions employed in Examples 2A–2Q. Thus, control hydrosilylations with untreated polyethers have the entry, none. SiH CONV. refers to the conversion of SiH functional groups. As was explained in Example 1, this value is a measure of the completeness of the hydrosilylation. PE BLEND refers to the 40.5 wt % PE550-OAc+59.5 wt % PE4000-OAc mixture treated with ascorbates in Examples 2C–2J.

The observations and SiH conversions show that ascorbate decomposition of peroxides eliminates the poor reactivity and incomplete reaction caused by these hydrosilylation inhibitors. Comparison of the reaction pairs 3A/3B, 3C/3D, 3E/3G, 3N/3P and 3Q/3R shows consist improved reactivity (higher exotherm in a shorter time) and complete reaction (100% SiH Conversion) with ascorbate processed polyethers containing low (<100 ppm) peroxide levels. Examples 3E–3M and 3Q–3U demonstrate that complete hydrosilylation can occur at polyether peroxide concentrations between about 100–500 ppm, but the exotherm is lower and the reaction time is longer.

Together with Examples 3E–3M and 3Q–3U, Examples 3V and 3W illustrate how consistent process performance can be realized by the routine ascorbate treatment of polyethers. Reduced reaction time during copolymer synthesis can provide manufacturing benefits such as increased throughput and increased unit capacity. Conversely, slow reactivity can lead to increased use of catalyst, the use of higher reaction temperatures, longer reaction times, decreased throughput and decreased unit capacity.

EXAMPLE 4

This example further illustrates the use of ascorbic acid and sodium ascorbate to destroy free radicals in polyethers of low or no hydrosilylation reactivity. ESR (Electron Spin Resonance) spectroscopy was used to establish the presence of free radicals in the untreated polyether samples and the absence of free radicals from the ascorbate-treated ones. A comparative experiment with $NaBH_4$ as the peroxide destroyer is also presented.

A blend of 40.5 wt % PE550-OAc and 59.5 wt % PE4000-OAc, which was incompletely reactive during hydrosilylation was treated with L-ascorbic acid and/or sodium L-ascorbate solutions as described in Example 2E. The peroxide content of the untreated blend and the ascorbate-treated product was analyzed by iodometric titration and found to be 1592 ppm and 12 ppm, respectively. ESR spectra of the untreated and treated polyether sample were recorded in the customary derivative mode with a Varian E-104A X-band spectrometer. Phenyl N-t-butylnitrone (PBN) was added to trap the free radicals associated with the oxidation impurities in the polyethers, thereby making these free radicals detectable by ESR. 0.03 gm PBN was added per gram of polyether sample and the mixture stirred for 8–10 minutes prior to transfer to the ESR tube for insertion into the spectrometer and measurement of the spectrum at 23° C. Since nitroxides can be reduced by ascorbates, (see L. J. Berliner (Editor), Spin Labeling: Theory and Applications, Academic Press, NY 1976, p 425), in some experiments $FeCl_2$ was added to the polyether containing oxidation impurities to effect the oxidation of Fe(II) to Fe(III). Fe(III) gives an intense ESR signal.

The ESR spectra showed strong signals in the characteristic triplet of doublet pattern (centered at g=2.005 with triplet splitting 14.2 Gauss and doublet splitting 2.6 Gauss) for the PBN spin adducts trapped in the untreated polyether sample. The spectral intensities increased with time up to ~5 hours. With the use of $FeCl_2$, a constant spin adduct intensity centered at g=2.00 was attained within 10 minutes. The ascorbic acid—sodium ascorbate treated sample showed no Fe(III) ESR signal and a very weak PBN spin adduct intensity after 3 hours.

A comparative ESR experiment was also done with $NaBH_4$-treated polyether. The polyether blend (81.0 gm) was mixed with 0.5 gm 30 wt % $NaBH_4$ solution in the apparatus of Example 2. The mixture was stirred and heated to 80° C. and held at that temperature for 2 hours. The cooled reaction mixture was neutralized with two drops concentrated HCl and filtered. The product (filtrate) was clear and colorless. Its peroxide content was 84 ppm by iodometric titration.

PBN was added to untreated and $NaBH_4$-treated samples as described above and the ESR spectra recorded. PBN spin adduct intensity was very weak and similar to that observed for the ascorbate-treated polyether blend. The titration and ESR results showed that the $NaBH_4$ treatment also destroyed the peroxides and free radicals present in the original polyether blend that was unreactive to hydrosilylation.

EXAMPLE 5

This example illustrates the use of ascorbyl palmitate and its mixtures with sodium ascorbate or ascorbic acid to decompose peroxides and other oxidation impurities in polyethers.

Treatment was performed at 82–85° C. for 2 hours in the apparatus described in Example 1. Quantities of polyethers and ascorbates employed are set forth in Table 6. The same lot of PE750-OMe was used in the experiments of Examples 5A–5G. Its peroxide content was 1300 ppm For the experiments of Examples 5H–5L, the PE550-OAc was unchanged, but the lot of PE4000-OAc used in Example 5L was different from that in 5H–5K. Initial peroxide content of the polyether blend in Examples 5H–5K was 2000 ppm and in Example 5L 1030 ppm. Ascorbyl palmitate is soluble in the polyethers and was used as received in all experiments, except Example 5B, in which the solid was dissolved in ethanol prior to its addition to the polyether to be treated. In the experiments of Examples 5A and 5C, the ascorbyl palmitate was fully dissolved at room temperature before the mixture was heated. Since dissolution of the solid in the polyether readily occurs on heating, a separate dissolution step at room temperature was omitted form the experiments of the other examples. Ascorbic acid and sodium ascorbate were used as 40 wt % aqueous solutions as described in Example 2. Reaction mixtures were generally yellow during treatment. No filtration was necessary in the experiments (5A–5D, 5H, 5I, 5L) wherein ascorbyl palmitate was the only antioxidant employed.

The data of Table 6 show that ascorbyl palmitate when used alone and in amounts greater than about 1 weight percent (based on the weight of polyether) reduced the peroxide levels of polyethers from >1000 ppm to ≦500 ppm Mixtures of ascorbyl palmitate and ascorbic acid or sodium ascorbate were also effective.

EXAMPLE 6

This example illustrates the improved hydrosilylation reactivity of polyethers treated with ascorbyl palmitate. Comparative data are also shown in Example 6L for the NaBH$_4$-treated polyether blend prepared in Example 4.

Hydrosilylations illustrated in Examples 6A–6E and 6K–6L were conducted in the absence of solvent as described above in Example 1. Examples 6F–6J were performed in dipropylene glycol as described in U.S. Pat. No. 4,857,583. The content of dipropylene glycol of the total reaction mixture was 15–16 weight percent. In the hydridosiloxane, $M'D_{60}D'_{10}M'$, $M'=(CH_3)_2SiHO_{1/2}$.

TABLE 6

TREATMENT OF POLYETHERS WITH ASCORBATE MIXTURES CONTAINING ASCORBYL PALMITATE

| EXAMPLE | POLYETHER, g | ASCORB PALMIT, g | SODIUM ASCORB, g | ASCORBIC ACID, g | PEROXIDE (ppm) INITIAL | FINAL |
|---|---|---|---|---|---|---|
| 5A | PE750-OMe, 150 | 1.6 | — | — | 1300 | 400 |
| 5B | PE750-OMe, 150 | 1.6* | — | — | 1300 | 500 |
| 5C | PE750-OMe, 150 | 5.3 | — | — | 1300 | 100 |
| 5D | PE750-OMe, 150 | 7.6 | — | — | 1300 | 30 |
| 5E | PE750-OMe, 150 | 0.34 | 1.38 | — | 1300 | 400 |
| 5F | PE750-OMe, 150 | 5.0 | 2.5 | — | 1300 | 0 |
| 5G | PE750-OMe, 150 | 5.0 | — | 2.5 | 1300 | 0 |
| 5H | 13 wt % PE550-OAc + 87 wt % PE4000-OAc, 254 | 5.1 | — | — | 2000 | 500 |
| 5I | 13 wt % PE550-OAc + 87 wt % PE4000-OAc, 200 | 10.0 | — | — | 2000 | 100 |
| 5J | 13 wt % PE550-OAc + 87 wt % PE4000-OAc, 200 | 6.0 | 4.5 | — | 2000 | 0 |
| 5K | 13 wt % PE550-OAc + 87 wt % PE4000-OAc, 200 | 6.0 | — | 4.5 | 2000 | 0 |
| 5L | 13 wt % PE550-OAc + 87 wt % PE4000-OAc, 200 | 6.0 | — | — | 1030 | 300 |

* = ascorbyl palmitate dissolved in ethanol.

TABLE 7

IMPROVED HYDROSILYLATION OF POLYETHERS TREATED WITH
ASCORBYL PALMITATE IN EXAMPLE 5

| EXAMPLE | POLYETHER | METHOD | SiH FLUID | NOTES | SiH CONV. |
|---|---|---|---|---|---|
| | PE750-OMe | | $MD_{43.2}D'_{6.8}M$ | | |
| 6A | 80.1 g | none | 44.7 g | 15° C. in 3.5 min | 85% |
| 6B | 80.1 | 5A | 44.7 | 17° C. in 3.8 min | 89 |
| 6C | 80.1 | 5D | 44.7 | 25° C. in 2.0 min | 100 |
| | PE750-OMe | | $M'D_{60}D'_{10}M'$ | | |
| 6D | 106.5 g | none | 46.4 g | 5° C. in 3.0 min | 80% |
| 6E | 106.5 | 5D | 46.5 | 16° C. in 3.5 min | 100 |
| | PE BLEND | | $MD_{70}D'_8M$ | | |
| 6F | 105.8 g | none | 28.9 g | 1° C. in 2.5 min | 80% |
| 6G | 92.1 | 5H | 25.2 | 3° C. in 2.0 min | 96 |
| 6H | 92.1 | 5I | 25.2 | 6° C. in 1.9 min | 100 |
| 6I | 92.1 | none | 25.1 | 1° C. in 2.5 min | 80 |
| 6J | 92.2 | 5L | 25.1 | 3° C. in 2.2 min | 96 |
| 6K | 65.6 | none | 29.7 | 10° C. in 4 min | 85 |
| 6L | 65.6 | $NaBH_4$ | 29.7 | 18° C. in 1.6 min | 100 |

(* = Comparative Example)

The data of Table 7 taken together with those of Table 6 show that hydrosilylation was rapid and complete when PE750-OMe or the blend of acetoxy capped polyethers had been treated with >1 weight percent ascorbyl palmitate. Hydrosilylations were complete in the absence of a solvent and in the presence of dipropylene glycol. Polyethers treated with mixtures of ascorbyl palmitate and ascorbic acid or sodium ascorbate also reacted smoothly, rapidly and completely during hydrosilylation.

EXAMPLE 7

This example illustrates the reduction and elimination of propanal and acetal formation in copolymers prepared from polyethers treated with sodium ascorbate and its mixtures with ascorbic acid. Examples 7A, 7C and 7E describe copolymer syntheses with PE750-OH treated with a 9:1 molar ratio of sodium ascorbate: ascorbic acid in Example 2T. The hydrosilylations of the untreated control sample are reported in Example 7B, 7D and 7F. Comparative solventless hydrosilylations with PE750-OH in which sodium propionate is added to prevent acetal formation are presented in Examples 7G–7I. Examples 7J–7M report on the propanal and acetal content of the copolymers prepared in Examples 3F, 3H, 3K and 3L. These copolymers were synthesized via solventless hydrosilylations of the blend of acetoxy-capped polyethers treated in Examples 2C, 2E, 2H and 2I.

Propanal was detected by its distinctive odor and by gas chromatography—mass spectrometry of a headspace sample. It was quantified by $^{13}C$ nmr and by headspace gas chromatography. Acetal formation was heralded by gellation of the copolymer product and the reversal of this gellation under acidic conditions. Gellation did not occur at lower levels of acetal formation. Molar concentrations of the propanal and acetal by-products were calculated relative to the content of siloxane-polyether copolymer formed during the hydrosilylation.

Quantities of the ascorbate-treated PE750-OH from Example 2T and the SiH fluids used in the hydrosilylations are summarized in Table 8. Hydrosilylations were performed as described in Example 1. Catalysis was initiated at 80° C. Platinum concentration was 10 ppm in Examples 7A, 7C and 7E, but 30 ppm in Examples 7B, 7D and 7F to take advantage of the improved reactivity of the ascorbate-treated polyether.

The hydrosilylation reactions of Examples 7A, 7C and 7E showed 18–20° exotherms in 1.5–2 minutes and complete conversion of all SiH functional groups. The copolymer products were liquid and had the viscosities shown in the table. Propanal odors were faint and measured <100 ppm by headspace gas chromatography. No acetal groups were detected by $^{13}C$ nmr of the samples. All three of the reactions in Examples 7B, 7D and 7F produced gelled, crosslinked copolymers instead of the desired fluid products.

EXAMPLES 7G–7I (COMPARATIVE EXAMPLES)

The solventless hydrosilylation experiments of these comparative examples were performed according to the method of Example 18 of U.S. Pat. No. 4,847,398. Quantities of sodium propionate ($NaOOC_3H_5$) and other reagents used are summarized in Table 9.

TABLE 8

HYDROSILYLATIONS WITH ASCORBATE-TREATED UNCAPPED POLYETHER OF EXAMPLE 2L

| EXAMPLE | SiH FLUID | WEIGHT, g | POLYETHER | WEIGHT, g | COPOLYMER VISCOSITY, (cst) |
|---|---|---|---|---|---|
| 7A | $MD_{43.2}D'_{6.8}M$ | 51.0 | PE750-OH (Ex. 2L) | 89.5 | 780 |
| 7B | $MD_{43.2}D'_{6.8}M$ | 44.2 | PE750-OH | 77.6 | gelled |
| 7C | $MD_{32}D'_{9.6}M$ | 30.2 | PE750-OH (Ex. 2L) | 90.6 | 720 |
| 7D | $MD_{32}D'_{9.6}M$ | 30.2 | PE750-OH | 90.8 | gelled |
| 7E | $M'D_{60}D'_{10}M'$ | 54.5 | PE750-OH (Ex. 2L) | 125.1 | 1000 |
| 7F | $M'D_{60}D'_{10}M'$ | 42.5 | PE750-OH | 101.3 | gelled |

TABLE 9

COMPARATIVE SOLVENTLESS HYDROSILYLATION WITH SODIUM PROPIONATE

| MATERIALS | EXAMPLE 7G | EXAMPLE 7H | EXAMPLE 7I |
|---|---|---|---|
| $MD_{43.2}D'_{6.8}M$, g | 34.0 | — | — |
| $MD_{32}D'_{9.6}M$, g | — | 21.6 | — |
| $M'D_{60}D'_{10}M'$, g | — | — | 42.5 |
| PE750-OH, g | 59.7 | 65.0 | 101.7 |
| $NaOOC_3H_5$, g | 0.06 | 0.07 | 0.11 |
| Pt Catalyst, cc | 0.35 | 0.35 | 0.50 |
| RESULTS | | | |
| APPEARANCE | liquid | liquid | liquid |
| VISCOSITY, cst | 800 | 700 | 1200 |

All three hydrosilylations produced liquid products having the distinct odor of propanal and with viscosities within experimental error of the corresponding samples in Examples 7A, 7C and 7E. Propanal concentrations were 200–500 ppm by headspace gas chromatography.

EXAMPLES 7J–7L

The solventless hydrosilylations of the blend of acetoxy-capped polyethers of Examples 2C–2J were illustrated hereinabove in Examples 3F–3M. Examples 7J–7M illustrate the decreased concentrations of propanal and acetal observed when polyethers are treated with sodium ascorbate and mixtures of ascorbic acid—sodium ascorbate containing $\geq$95 weight percent sodium ascorbate.

Samples of the copolymer products from Example 3 were diluted 50% by volume with 0.05 molar tris(acetoacetonate) chromium (III), $Cr(acac)_3$, in deuterated benzene and placed in 10 mm diameter nmr tubes for analysis by $^{13}C$ nmr. Spectra were measured on a Varian VXR-300 Spectrometer at a frequency of 75.4 MHz. Data were acquired using on-acquisition gated Waltz-16 decoupling with a duty cycle of 30%. The center resonance of benzene (128 ppm) was used as the chemical shift reference. Table 10 lists the concentrations (mole %) of propanal and acetal in each sample relative to that sample's content of $SiCH_2CH_2CH_2$ groups. These values were calculated by dividing the integration intensity at 204 ppm (chemical shift of propanal C=O), and that at 104 ppm (chemical shift of acetal CH), by the average intensity per carbon atom for the silicon-linked propyl group.

TABLE 10

EFFECT OF POLYETHER TREATMENT ON CONCENTRATION OF ACETAL AND PROPANAL IN SILOXANE-POLYETHER COPOLYMERS

| EXAMPLE | POLYETHER TREATMENT | COPOLYMER PRODUCT | PROPANAL | ACETAL |
|---|---|---|---|---|
| 7J | Example 2C 100% Ascorbic Acid | Example 3F | 0.10 | 0.15 |
| 7K | Example 2E 92% Sodium Ascorbate/ Ascorbic Acid | Example 3H | 0.10 | 0.10 |
| 7L | Example 2H 99% Sodium Ascorbate/ Ascorbic Acid | Example 3K | nd | nd |
| 7M | Example 2I 100% Sodium Ascorbate | Example 3L | nd | nd | nd = Not Detectable

The copolymers, 3F and 3G, made with ascorbic acid treated polyether, had a noticeable odor of propanal. Table 10 shows that $^{13}C$ nmr integration intensity ratio was 0.10 mole % for propanal and 0.15 mole % for acetal in copolymer 3F. A reduction of acetal formation was observed in copolymer 3H whose polyether blend was treated with a 92 wt % sodium ascorbate—8 wt % ascorbic acid mixture. When the polyether blend was treated with an ascorbate mixture containing $\geq$95 wt % sodium ascorbate, the copolymer product had no dissemble propanal smell. $^{13}C$ nmr analysis confirmed that these copolymer products (for example, 3K, 3L) contained very low or no detectable levels of propanal and acetal.

EXAMPLE 8

This example illustrates the use of citric acid—sodium citrate mixtures in decomposing peroxides and other hydrosilylation inhibitors in polyethers that are unreactive to hydrosilylation The experiment was conducted using the apparatus and method described in Example 2. 300 g PE1500-OAc containing 1780 ppm peroxide was charged to a 500 ml flask along with 0.70 g 40 wt % aqueous sodium citrate solution and 0.1 g 40 wt % aqueous citric acid solution. This reaction mixture was stirred mechanically, heated to 85° C. and held at that temperature for 2 hours. On cooling to ambient temperature, the mixture was pressure filtered and the clear filtrate retained for peroxide analysis and hydrosilylation. It was found to contain 110 ppm peroxide.

EXAMPLE 9

This example illustrates the improved hydrosilylation reactivity of polyethers treated with sodium citrate—citric acid to decompose peroxides and other hydrosilylation inhibitors. The experiment was conducted without solvent using the apparatus, method and catalyst of Example 1. The reagents were 69.4 g of the treated PE 1500-OAc product from Example 8 and 26.6 g of $MD_{45}D'_{5.1}M$. Catalysis was initiated at 82° C., after which the reaction temperature increased 16° C. to 98° C. within 1.7 min. No Residual SiH functional groups were detected in the copolymer product. A comparative experiment with 69.4 g of the original untreated PE1500-OAc polyether of Example 8 and 26.6 g of $MD_{45}D'_{5.1}M$ from the same lot produced only a 5° C. exotherm after 8.2 minutes. About 45% of the SiH functional groups remained unreacted.

DESCRIPTION OF MATERIALS AND DEFINITIONS USED IN THE FOAM TESTS

MATERIALS

HCFC-141b -$CH_3CCl_2F$, a blowing agent with normal boiling point 32° C.

HCFC-22-$CHClF_2$, a blowing agent with normal boiling point −40.8° C.

L-5342, L-5440, L-6990, Y-10764, L-620 are all commercial silicone surfactants supplied by OSi Speciakies, Inc.

Dimethylcyclohexylamine (Polycat 8), Dabco K-15 a potassium based trinerization catalyst DMP-30 (2,4.6-tris(dimethylaminomethyl)phenol)

Polymeric MDI is polymeric methylene diisocyanate having 31.5 weight percent isocyanate.

TDI (toluene diisocyanate) is a mixture of approximately 80 weight percent of the 2,4-isomer and 20 weight percent of the 2,6-isomer.

ARCOL® Polyol 16-56 is supplied by ARCO Company, Inc.

NIAX® catalyst A-200 is a mixture of tertiary arnines and a glycol supplied by OSi Specialties, Inc.

DEFINITIONS

Hydroxyl Number=The number of milligrams of potassium hydroxide that is chemically equivalent to the activity of a specified weight of the polyol.

Isocyanate Index=the stoichiometric ratio of isocyanate and isocyanate-reactive (e.g., hydroxyl and amine) groups
Concn=concentration
pphp=parts per hundred parts polyol
rpm=revolutions per minute
g=gram
cm=centimeter
in=inch
lb/in$^2$ or psi=pounds per square inch
Btu=British thermal unit
SCFM=standard cubic feet per minute
Potency=the quantity of surfactant required to stabilize a foam to a standard height. High potency surfactants produce high foam heights and nimal or no top collapse at relatively low use levels.
Breathability (Air Flow)=the passage or air or another gas through a foam. A tight foam has low breathability; an open foam has high breathability and permits the facile passage of gas. High breathability is desired in flexible foams.
Top Collapse=decrease in height of flexible foam one minute after blow-off.

EXAMPLE 10

This example illustrates the performance of some of the siloxane-polyether copolymers (viz: 3B, 3D, 3P, 3W, 6E, 7C, 7E and 9) prepared with ascorbate or citrate treated polyethers in stabilizing rigid foam formulations. The copolymers were tested in three rigid foam formulations. OSi Specialties silicone surfactants, L-5342, L-5440, L-6900 and Y-10764 were used as controls.

Formulation A is illustrative of HCFC-141b blown polyurethane appliance compositions. Formulations B and C are polyisocyanurate boardstock compositions blown with HCFC-141b and HCFC-141b/HCFC-22, respectively. In Formulation C, HCFC-22 was contained in both the isocyanate (so called A Side) and polyol (so called B or resin Side) sides. Typically, the polyol, catalyst, water and blowing agent were combined prior to the foam test to form the resin or B Side. Capped copolymers such as 3B, 3D, 3P, 3W and 9 could be added to either side, but the uncapped copolymers such as 6E, 7C and 7E may be added only to the polyol side. Both the A and B side mixtures were kept in temperature controlled (20° C.) baths prior to the foam tests.

| FORMULATION A: HCFC-141b RIGID POLYURETHANE APPLIANCE FOAM TEST FORMULATION | |
|---|---|
| MATERIAL | PARTS BY WEIGHT |
| SORBITOL-BASED POLYOL (Hydroxyl Number = 490) | 66.36 |
| AROMATIC POLYESTER POLYOL (Hydroxyl Number = 315) | 53.20 |
| WATER | 1.00 |
| DIMETHYLCYCLOHEXYLAMINE CATALYST | 2.00 |
| SILICONE SURFACTANT | 1.50 |
| HCFC-141b | 36.00 |
| POLYMERIC MDI (Equivalent Weight = 133.00) | 157.91 |
| ISOCYANATE INDEX = 120 | |

| FORMULATION B: HCFC-141b RIGID POLYISOCYANURATE FOAM TEST FORMULATION | |
|---|---|
| MATERIAL | PARTS BY WEIGHT |
| AROMATIC POLYESTER POLYOL (Hydroxyl Number = 246) | 100.00 |
| DABCO K-15 | 2.50 |
| DMP-30 | 0.80 |
| HCFC-141b | 35.00 |
| SILICONE SURFACTANT | 3.00 |
| POLYMERIC MDI (Equivalent Weight = 133.00) | 181.00 |
| ISOCYANATE INDEX = 300 | |

| FORMULATION C: HCFC-141B/HCFC-22 RIGID POLYISOCYANURATE FOAM TEST FORMULATION | |
|---|---|
| MATERIAL | PARTS BY WEIGHT |
| AROMATIC POLYESTER POLYOL (Hydroxyl Number = 246) | 100.00 |
| DABCO K-15 | 2.50 |
| DMP-30 | 0.80 |
| HCFC-141b | 24.00 |
| HCFC-22 | 4.40 |
| SILICONE SURFACTANT | 3.00 |
| POLYMERIC MDI (Equivalent Weight = 133.00) | 181.00 |
| ISOCYANATE INDEX = 300 | |
| HCFC-22 | 4.40 |

Both free rise and molded foam samples were prepared. Free rise foams, confined in a temperature-controlled (120° F.) metallic tube (180 cm height×6 cm diameter) lined with polyethylene film and open at the top, were used for the determination of foam flowability (flow index), defined as the ratio of foam rise (centimeters) to weight (grams) of formulation used. A high value of flow index is desirable. Free rise foams confined in cake boxes (8×8×5 in) were prepared for the polyisocyanurate formulations B and C and sectioned for the measurement of thermal conductivity, compressive strength and closed cell content. Molded foams (vertically oriented metal molds: 12×12×3 1n at 120° F.) were prepared for the determination of thermal conductivity, compressive strength, dimensional stability and closed cell content of the appliance formulation, A. Initial and aged K-factors (Btu.in/ft$^2$.hr.° F.) were measured in accordance with ASTM C518, compressive strengths (lb/in$^2$) according to ASTM D1621-73, dimensional change by ASTM D2126-62T and closed cell content (porosity) by the air comparison pycnometer using ASTM 2856-87. Some foam columns from the flow tube test were set aside at ambient temperature and observed periodically for bending and warpage. Dimensionally stable foams showed no or minimal bending. Other foam columns were sectioned at 6 inch intervals for determination of density variation with height of rise. The best performing surfactants produce a nearly flat density distribution for most of the length of the flow tube.

All laboratory testing was done in the so-called handmix mode. A 2 inch Conn high viscosity mixer operating at 3500 rpm was used for formulation A and one operating at 2500 rpm was used for formulations B and C. The A (isocyanate containing) and B (polyol containing) sides of each formulation and the silicone surfactants were maintained at 20° C. prior to mixing. With formulation A, the surfactant and resin were mixed at 3500 rpm for 5 seconds, isocyanate was added during a 3 second period without interruption of the mixing, which was continued for a further 4 seconds. The reaction mixture was then emptied into the cake box or metal mold. In case of the flow tube test, the cup containing the reaction mixture was attached tightly to the lower end of the tube. An initial resin—surfactant mixing time of 10 seconds was used with formulations B and C. Isocyanate pour time was 2 seconds and final mixing time was 4 seconds.

Performance and physical properties of the foams prepared are set forth in the following tables.

TABLE 11

PERFORMANCE OF COPOLYMERS PREPARED WITH ASCORBATE TREATED POLYETHERS IN HCFC-141b APPLIANCE FORMULATION (A)

| PROPERTY | 3B | 6E | 7C | 7E | L-6900 |
|---|---|---|---|---|---|
| K-FACTOR (Initial) | 0.122 | 0.122 | 0.120 | 0.122 | 0.120 |
| COMPRESSIVE STRENGTH (psi) | | | | | |
| Parallel | 20.8 | 20.1 | 17.2 | 19.0 | 18.1 |
| Perpendicular | 17.9 | 15.0 | 15.4 | 14.7 | 14.0 |
| CLOSED CELLS % | 91 | 93 | 91 | 93 | 93 |
| FLOW INDEX cm/g | 0.97 | 0.98 | 0.96 | 0.98 | 0.96 |

TABLE 12

PERFORMANCE OF COPOLYMERS PREPARED WITH ASCORBATE TREATED POLYETHERS IN THE HCFC-141b POLYISOCYANURATE FORMULATION (B).

| PROPERTY | 3B | 3D | 3P | L-5342 | Y-10764 |
|---|---|---|---|---|---|
| K-FACTOR | | | | | |
| (Initial) | 0.126 | 0.126 | 0.118 | 0.125 | 0.122 |
| (Aged 30 days) | 0.158 | 0.158 | 0.154 | 0.156 | 0.158 |
| COMPRESSIVE STRENGTH (psi) | | | | | |
| Parallel | 35 | 33 | 38 | 33 | 37 |
| Perpendicular | 28 | 26 | 32 | 27 | 31 |
| CLOSED CELLS % | 90 | 90 | 95 | 90 | 93 |

K-Factor in Btu. in/ft$^2$ hr. ° F. in Tables 11–13

TABLE 13

PERFORMANCE OF COPOLYMERS PREPARED WITH ASCORBATE TREATED POLYETHERS IN THE HCFC-141b/ HCFC-22 POLYISOCYANURATE FORMULATION (C).

| PROPERTY | 3P | 3W | 6E | 9 | Y-10764 |
|---|---|---|---|---|---|
| K-FACTOR | | | | | |
| (Initial) | 0.126 | 0.132 | 0.126 | 0.131 | 0.128 |
| (Aged 30 days) | 0.153 | 0.167 | 0.154 | 0.167 | 0.158 |
| COMPRESSIVE STRENGTH (psi) | | | | | |
| Parallel | 35 | 31 | 34 | 31 | 33 |
| Perpendicular | 28 | 21 | 29 | 22 | 25 |
| CLOSED CELLS % | 92 | 90 | 91 | 90 | 91 |

EXAMPLE 11

This example illustrates the performance of some of the siloxane-polyether copolymers (viz: 3F, 3H, 3H, 3L and 6H) prepared from ascorbate-treated polyethers in stabilizing flexible slabstock foam formulations. Data for a control (OSi Specialties surfactant L-620) and the copolymer of Example 6L prepared from NaBH$_4$-treated polyether are also presented. The polyurethane foam test formulation, D, is set forth below.

FORMULATION D: FLEXIBLE POLYURETHANE FOAM TEST FORMULATION

| MATERIAL | PARTS BY WEIGHT |
|---|---|
| ARCOL$^R$ Polyol 16-56 | 100 |
| Distilled Water | 5.5 |
| NIAX$^R$ Catalyst A-200 | 0.2 |
| Methylene Chloride | 10.2 |
| Stannous Octoate | 0.23 |
| Toluene diisocyanate (TDI)$^a$ | 69.44 |
| Surfactant | varied$^b$ |

$^a$The isocyanate index was 112
$^b$Surfactant samples (for example 6H) containing diluent (for example, dipropylene glycol) were evaluated at the same contained copolymer concentration as undiluted samples.

PROCEDURE FOR PREPARATION AND TESTING OF FLEXIBLE POLYURETHANE FOAMS

The temperature of the laboratory, the polyol and the TDI were recorded. A 32 ounce paper cup was charged with the ARCOL® polyol 16-56 (250 g), the surfactant to be evaluated, amine-water premix (containing 13.75 g water and 0.5 g NIAX® catalyst A-200), and methylene chloride (25 g). A brass mixing baffle with four equally spaced 0.5 inch wide vertical baffles was inserted into the cup, and the mixture was stirred for 15 seconds at 2150 rpm using a drill press with a marine blade. After 20 seconds, stannous octate (0.575 g equivalent to 0.46 mL) was added to the mixture. A timer was started and the mixture was stirred for 8 seconds before 80/20 TDI (173.6 g equivalent to an isocyanate index of 112) was added without interruption of the stirring. Stirring was continued for another seven seconds before the mixing was stopped and the reaction mixture emptied into a preweighed five gallon plastic bucket. The inverted cup was held in place over the bucket for a total of ten seconds.

As the foaming liquid began to rise in the bucket, a small (1 inch×1 inch) square of aluminum foil was placed on its top to support a fixed length of wire threaded through a 1 cm diameter tube calibrated for recording foam heights in inches. The maximum height of the foam at blowoff, the extent of top collapse after one minute and the rise time are recorded. The foam was then post-cured in an oven at 120° C. for ten minutes and was allowed to stand undisturbed for 16–24 hours.

The final height of the foam was then measured in centimeters, and the foam was sectioned on a band saw for the determination of its physical properties. Pieces (2 in×2 in×1 in) were cut from three places, viz: the center, 1.5 inches from the top surface and 1.5 inches from the bottom surface. Density and Nopco breathability of each piece were measured by standard methods, the density by ASTM D 3574-91; breathability by the method of Jones and Fesman in J. Cellular Plastics, 1 (1965) pp 3–19. The breathability apparatus had an adjusted back pressure of 0.5 inches of water and recorded air flow in standard cubic feet per minute. Relevant portions of both cited references are incorporated herein by reference. Foam structure was assessed visually by noting the cell size and cell size distribution. Small, uniform cells denote a fine foam structure designated F in Table 14. This is desirable. Coarse foam structures (designated C in Table 14) are undesirable. Extremely coarse, spongy or partially collapsed foams were often not examined for structure, density or breathability. Foam structures designated M (medium) were generally fine-celled, but showed a broader range of cell sizes than is desirable.

Profiles of final foam height, foam top collapse, foam density and foam breathability (top, center and bottom) were plotted versus surfactant concentration (in pphp) for each surfactant. Surfactant potency was defined as the surfactant concentration yielding a foam height (normalized to constant temperature) of 35 cm after top collapse.

Table 14 summarizes the foam performance data for the copolymers of Examples 3F, 3H, 3K, 3L and 6H of this invention. Data for the copolymer from the NaBH$_4$-treated polyether (Example 6L) and for the commercial surfactant L-620 are also shown. It is clear that the copolymers prepared with the ascorbate-treated polyethers gave acceptable performance comparable with the commercial control. In contrast, copolymer 6L gave low breathability foams with inferior cell structure. Some other copolymers prepared from NaBH$_4$-treated polyethers gave foams with low heights of rise (34 cm at 1.25 pphp), severe top collapse (4–11 cm), low breathability (2–3 SCFM), coarse cell and voids when tested in the formulation D.

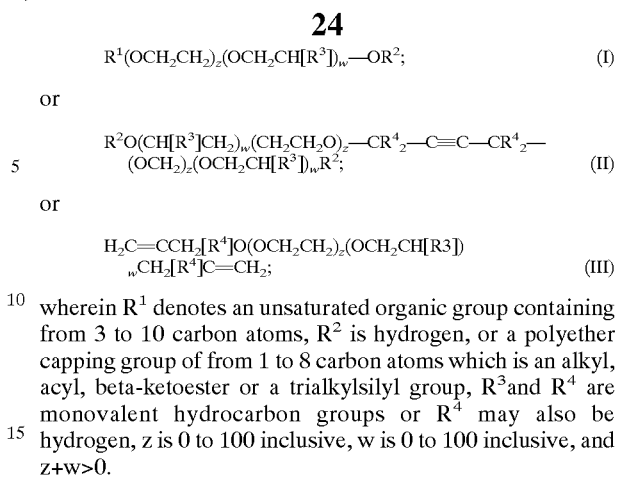

6. A composition formed in accordance with the method of claim 1 comprising an unsaturated polyether and 0.01 to

TABLE 14

PERFORMANCE OF COPOLYMERS OF
EXAMPLES 3F, 3H, 3K, 3L, 6H IN THE FLEXIBLE FOAM FORMULATION (D)

| PEROXIDE REMOVAL/ COPOLYMER | COPOLYMER CONCN pphp | HEIGHT cm | TOP COLLAPSE cm | AIR FLOW middle | AIR FLOW bottom | STRUCTURE |
|---|---|---|---|---|---|---|
| NONE | 0.4 | 38.1 | 1.8 | 7.50 (scfm) | 5.75 (scfm) | M |
| L-620 | 0.7 | 40.4 | 0.8 | 6.50 | 4.75 | F |
| CONTROL | 1.25 | 40.4 | 0.8 | 6.25 | 4.00 | F |
| Sodium | 0.4 | 38.3 | 1.3 | 7.50 | 5.50 | M |
| Ascorbate | 0.7 | 40.3 | 0.4 | 6.25 | 4.25 | F |
| Example 3L | 1.25 | 40.0 | 0.1 | 6.00 | 3.50 | F |
| Ascorbic | 0.4 | 39.4 | 1.0 | 7.00 | 5.00 | F |
| Acid | 0.7 | 40.1 | 0.5 | 6.00 | 4.00 | F |
| Example 3F | 1.25 | 40.6 | 0.2 | 5.50 | 3.00 | F |
| Ascorbate | 0.4 | 38.1 | 1.8 | 7.00 | 5.00 | F |
| Mixture | 0.7 | 40.6 | 0.8 | 6.75 | 4.50 | F |
| Example 3H | 1.25 | 40.1 | 0.2 | 5.50 | 3.50 | F |
| Ascorbate | 0.4 | 38.1 | 1.3 | 8.00 | 6.00 | F |
| Mixture | 0.7 | 40.1 | 0.8 | 7.00 | 5.00 | F |
| Example 3K | 1.25 | 38.9 | 0.0 | 5.00 | 3.00 | F |
| Ascorbyl | 0.4 | 37.3 | 2.5 | 7.00 | 6.00 | F |
| Palmitate | 0.7 | 38.9 | 1.0 | 6.50 | 5.25 | F |
| Example 6H | 1.25 | 39.8 | 0.5 | 6.50 | 5.00 | F |
| NaBH$_4$ | 0.4 | 37.5 | 2.4 | 4.00 | 3.00 | M |
| Comparative | 0.7 | 35.8 | 3.1 | 4.50 | 4.00 | F |
| Example 6L* | 1.25 | 38.9 | 1.3 | 5.00 | 3.50 | F |

What is claimed is:

1. A method for decomposing oxidation impurities present in unsaturated polyethers, comprising adding thereto an additive selected from the group consisting of ascorbic acid, derivatives of ascorbic acid, citric acid, derivatives of citric acid, and mixtures thereof, in an amount thereof effective to decompose said impurities.

2. The method of claim 1 wherein the amount of said additive which is added to said polyether is 0.01 to 20% by weight of the polyether.

3. The method of claim 1 wherein said additive is selected from the group consisting of ascorbic acid, esters, ethers, alkali metal salts, alkaline earth metal salts, and ketals of ascorbic acid, citric acid, and esters, alkali metal salts, and alkaline earth metal salts of citric acid, and mixtures thereof.

4. The method of claim 1 wherein said additive is selected from the group consisting of ascorbic acid, sodium ascorbate, ascorbyl palmitate, citric acid, and sodium citrate.

5. The method of claim 1 wherein said polyether is selected from the group consisting of blocked and random polyoxyalkylenes having the general formula:

20%, by weight of said polyether, of an additive selected from the group consisting of ascorbic acid, derivatives of ascorbic acid, citric acid, derivatives of citric acid, and mixtures thereof.

7. The composition of claim 6 wherein said polyether is selected from the group consisting of blocked and random polyoxyalkylenes having the general formula:

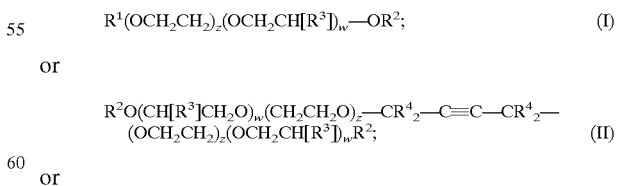

wherein $R^1$ denotes an unsaturated organic group containing from 3 to 10 carbon atoms, $R^2$ is hydrogen, or a polyether capping group of from 1 to 8 carbon atoms which is an alkyl, acyl, beta-ketoester or a trialkylsilyl group, $R^3$ and $R^4$ are monovalent hydrocarbon groups or $R^4$ may also be hydrogen, z is 0 to 100 inclusive, w is 0 to 100 inclusive, and z+w>0.

8. The composition of claim 6 wherein said additive is selected from the group consisting of ascorbic acid, esters, ethers, alkali metal salts, alkaline earth metal salts, and ketals of ascorbic acid, citric acid, and esters, alkali metal salts, and alkaline earth metal salts of citric acid, and mixtures thereof.

9. The composition of claim 6 wherein said additive is selected from the group consisting of ascorbic acid, sodium ascorbate, ascorbyl palmitate, citric acid, and sodium citrate.

10. A method for carrying out a hydrosilylation reaction between an organohydridosiloxane and an unsaturated polyether, comprising adding to said polyether an additive selected from the group consisting of ascorbic acid, derivatives of ascorbic acid, citric acid, derivatives of citric acid, and mixtures thereof in accordance with claim 1 to form a mixture of said polyether and said additive, and thereafter combining said organohydridosiloxane and said mixture and carrying out said hydrosilylation reaction between said organohydridosiloxane and said polyether.

11. The method of claim 10 wherein the amount of said additive which is added to said polyether is 0.01 to 20% by weight of the polyether.

12. The method of claim 10 wherein said additive is selected from the group consisting of ascorbic acid, esters, ethers, alkali metal salts, alkaline earth metal salts, and ketals of ascorbic acid, citric acid, and esters, alkali metal salts, and alkaline earth metal salts of citric acid, and mixtures thereof.

13. The method of claim 10 wherein said additive is selected from the group consisting of ascorbic acid, sodium ascorbate, ascorbyl palmitate, citric acid, and sodium citrate.

14. The method of claim 10 wherein said polyether is selected from the group consisting of blocked and random polyoxyalkylenes having the general formula:

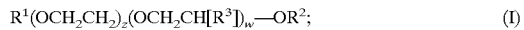

or

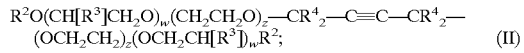

or

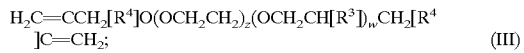

wherein $R^1$ denotes an unsaturated organic group containing from 3 to 10 carbon atoms, $R^2$ is hydrogen, or a polyether capping group of from 1 to 8 carbon atoms which is an alkyl, acyl, beta-ketoester or a trialkylsilyl group, $R^3$ and $R^4$ are monovalent hydrocarbon groups or $R^4$ may also be hydrogen, z is 0 to 100 inclusive, w is 0 to 100 inclusive, and z+w>0.

15. The product of the hydrosilylation reaction carried out in accordance with claim 10.

16. The product of the hydrosilylation reaction carried out in accordance with claim 11.

17. The product of the hydrosilylation reaction carried out in accordance with claim 12.

18. The product of the hydrosilylation reaction carried out in accordance with claim 13.

19. The product of the hydrosilylation reaction carried out in accordance with claim 14.

* * * * *